(12) United States Patent
Belcheva

(10) Patent No.: US 8,207,264 B2
(45) Date of Patent: Jun. 26, 2012

(54) FUNCTIONALIZED INCLUSION COMPLEXES AS CROSSLINKERS

(75) Inventor: Nadya Belcheva, Hamden, CT (US)

(73) Assignee: Tyco Healthcare Group LP, Mansfield, MA (US)

( * ) Notice: Subject to any disclaimer, the term of this patent is extended or adjusted under 35 U.S.C. 154(b) by 105 days.

(21) Appl. No.: 12/493,508

(22) Filed: Jun. 29, 2009

(65) Prior Publication Data

US 2010/0010159 A1    Jan. 14, 2010

Related U.S. Application Data

(60) Provisional application No. 61/079,833, filed on Jul. 11, 2008.

(51) Int. Cl.
*A61K 47/48* (2006.01)
(52) U.S. Cl. .................................. 525/54.2; 525/403
(58) Field of Classification Search .................. 525/54.2, 525/403
See application file for complete search history.

(56) References Cited

U.S. PATENT DOCUMENTS

| | | | |
|---|---|---|---|
| 4,715,369 A | 12/1987 | Suzuki et al. |
| 4,722,815 A | 2/1988 | Shibanai |
| 4,997,656 A | 3/1991 | Shikinami et al. |
| 5,183,809 A | 2/1993 | Weisz et al. |
| 5,258,414 A | 11/1993 | Bergishagen |
| 5,262,404 A | 11/1993 | Weisz et al. |
| 5,290,831 A | 3/1994 | DiRuocco et al. |
| 5,312,864 A | 5/1994 | Wenz et al. |
| 5,352,717 A | 10/1994 | Bergishagen |
| 5,362,496 A | 11/1994 | Baker et al. |
| 5,516,766 A | 5/1996 | Weisz et al. |
| 5,594,125 A | 1/1997 | Seyschab et al. |
| 5,728,823 A | 3/1998 | Reuscher et al. |
| 5,777,003 A | 7/1998 | Haas et al. |
| 5,792,821 A | 8/1998 | Bowen |
| 5,910,551 A | 6/1999 | Bowen |
| 5,929,131 A | 7/1999 | Bowen |
| 5,958,443 A | 9/1999 | Viegas et al. |
| 5,981,740 A | 11/1999 | Bowen |
| 6,048,736 A | 4/2000 | Kosak |
| 6,136,334 A | 10/2000 | Viegas et al. |
| 6,180,739 B1 | 1/2001 | Bowen |
| 6,294,629 B1 | 9/2001 | O'Dwyer et al. |
| 6,323,278 B2 | 11/2001 | Rhee et al. |
| 6,583,248 B1 | 6/2003 | Bowen |
| 6,689,378 B1 | 2/2004 | Sun et al. |
| 6,730,722 B1 | 5/2004 | Eck et al. |
| 6,835,789 B1 | 12/2004 | Kneafsey et al. |
| 6,867,241 B2 | 3/2005 | Wojciak et al. |
| 6,887,974 B2 | 5/2005 | Pathak |
| 7,008,979 B2 | 3/2006 | Schottman et al. |
| 7,009,034 B2 | 3/2006 | Pathak et al. |
| 7,045,559 B2 | 5/2006 | Yahiaoui et al. |
| 7,057,019 B2 | 6/2006 | Pathak |
| 2003/0073663 A1 | 4/2003 | Wiseman et al. |
| 2003/0092672 A1 | 5/2003 | Darcy et al. |
| 2003/0108511 A1 | 6/2003 | Sawhney |
| 2003/0144222 A1 | 7/2003 | Wang |
| 2003/0157161 A1 | 8/2003 | Hunter et al. |
| 2004/0072799 A1 | 4/2004 | Li et al. |
| 2004/0157989 A1 | 8/2004 | Bruhn et al. |
| 2004/0260045 A1 | 12/2004 | Kneafsey et al. |
| 2005/0049383 A1* | 3/2005 | Takata et al. ................. 528/44 |
| 2005/0089504 A1 | 4/2005 | Uhrich |
| 2005/0276841 A1 | 12/2005 | Davis et al. |
| 2005/0281883 A1 | 12/2005 | Daniloff et al. |
| 2006/0094833 A1 | 5/2006 | McDonnell et al. |
| 2006/0147409 A1 | 7/2006 | Pathak et al. |
| 2006/0148756 A1 | 7/2006 | Darcy et al. |

FOREIGN PATENT DOCUMENTS

| | | |
|---|---|---|
| DE | 19745527 A1 | 4/1999 |
| EP | 0 511 635 A1 | 4/1992 |
| EP | 1283218 A | 2/2003 |
| EP | 1316321 A | 6/2003 |
| EP | 1921102 A | 5/2008 |
| EP | 1921104 A | 5/2008 |
| EP | 1921105 A | 5/2008 |
| WO | 01/13968 A1 | 3/2001 |
| WO | 02/09782 A1 | 2/2002 |
| WO | 2006/008499 A1 | 1/2006 |

OTHER PUBLICATIONS

Takashima et al., "Cyclodextrin-Initiated Polymerization of Cyclic Esters in Bulk Formation of Polyester-Tethered Cyclodextrins", J. Am. Chem. Soc, vol. 126, No. 42, 2004, pp. 13588-13589.
Kataoka et al.., "Local and Network Structure of Thermoreversible Pollyrotaxane Hydrogels Based on Poly(ethyleneglycol) and Methylated α-Cyclodextrins", J. Phys. Chem B 2006, vol. 110, pp. 24377-24383.
Bellocq et al., "Synthetic Biocompatible Cyclodextrin-Based Constructs for Local Gene Delivery to Improve Cutaneous Wound Healing", American Chemical Society, 2004, pp. A-J.
Young et al., "Cyclodextrin-Based Polymers: Nanomaterials With Built-in Scavenging Capabilities", Polymer Preprints 2001 42(2), pp. 162-163.
Yamaguchi et al., "Preparation and Characterization of Polyurethane-Cyclodextrin Pseudopolyrotaxanes", Macromolecules 1999, 32, pp. 2051-2054. Cheng et al., "A Strategy for Developing Nove Structural Polyurethanes and Functional Materials. Controlled/Living Free-Radical Polymerization of Acryloyl Azide under $^{60}$Co γ-ray Irradiation", American Chemical Society, 2005 pp. A-C.
Rusa et al., "Competitive Formation of Polymer-Cyclodextrin Inclusion Compounds", Macromolecules 2003, 36, pp. 2742-2747.
European Search Report for EP 09251770.5-2115 date of completion is Oct. 30, 2009 (4 pages).

* cited by examiner

*Primary Examiner* — David W Wu
*Assistant Examiner* — Robert Jones, Jr.

(57) ABSTRACT

The present disclosure relates to crosslinked polymer compositions comprising an inclusion complex functionalized with one or more reactive groups and a polymer functionalized with one or more complimentary reactive groups.

22 Claims, 5 Drawing Sheets

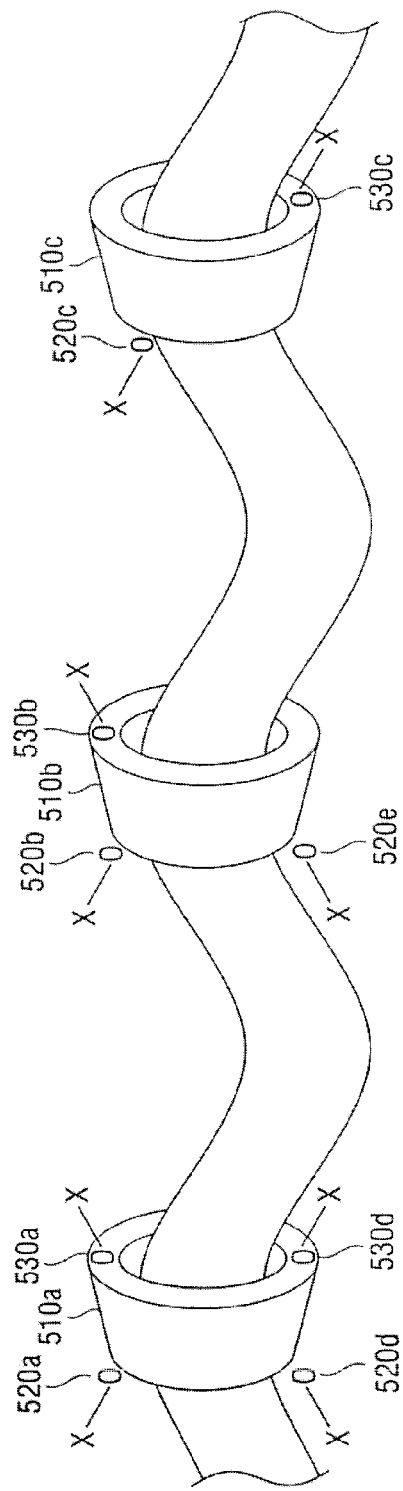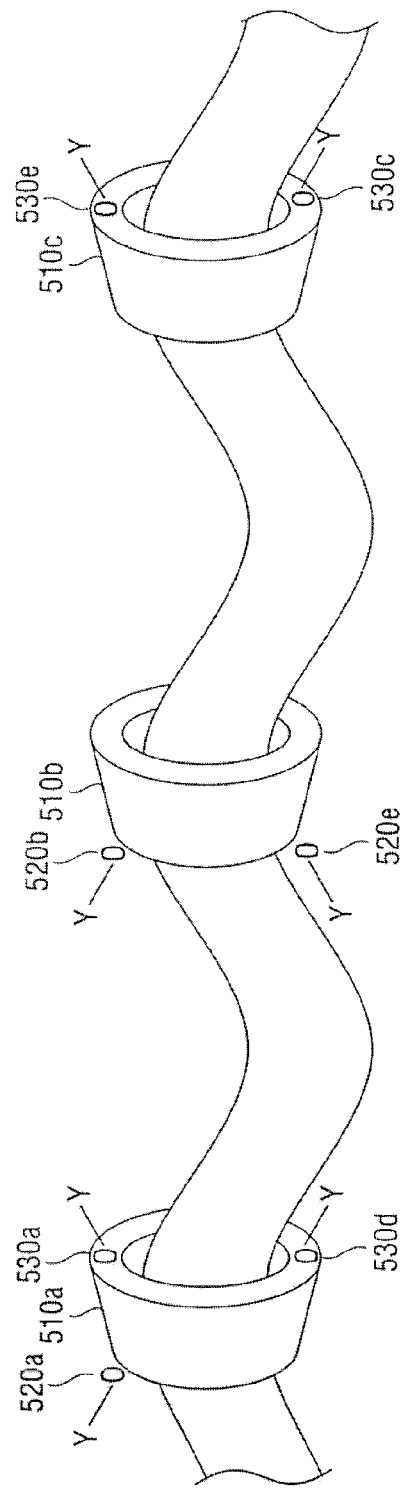
FIG. 5A
FIG. 5B

FUNCTIONALIZED INCLUSION COMPLEXES AS CROSSLINKERS

CROSS-REFERENCE TO RELATED APPLICATION

The present application claims the benefit of and priority to U.S. Provisional Application Ser. No. 61/079,833, filed on Jul. 11, 2008, the entire disclosure of which is incorporated herein by reference.

BACKGROUND

1. Technical Field

The present disclosure relates generally to crosslinked polymer networks and compositions containing them. More particularly, a functionalized inclusion complex is crosslinked using a functionalized polymer. Methods of using such crosslinked polymer networks are also described.

2. Background of Related Art

There have been numerous disclosures surrounding the formation and usage of inclusion complexes and host/guest chemistry. Specifically, several U.S. patents discuss the use of cyclodextrin to form an inclusion complex as well as to form a variety of chemical compositions with the inclusion complex. Some non-limiting examples include:

U.S. Pat. No. 4,906,488 which describes cyclodextrins amongst many polymers for delaying the release of permeants to outside hosts;

U.S. Pat. No. 5,258,414, which describes the incorporation of cyclodextrin or a complex of cyclodextrin and blowing agent into a thermoplastic to improve certain properties but does not disclose formulations or means to formulate compositions of the present invention;

U.S. Pat. No. 5,268,286, which describes a method of immobilizing biocatalysts to various polymers that are unrelated to those of the present invention. They include cyclodextrin glucocyltransferase among the biocatalysts that can be immobilized;

U.S. Pat. No. 5,362,496 which describes the preparation of nicotine-beta-cyclodextrin complexes; and U.S. Pat. No. 5,416,181, which includes cyclodextrins in a list of water-soluble components to prevent coalescence of water-insoluble polymeric particles in film-forming compositions.

However, nowhere has it been disclosed to functionalize an inclusion complex in a manner which allows the complex to crosslink with another polymer or inclusion complex which is functionalized with a complimentary reactive group to form a crosslinked polymer composition.

SUMMARY

Crosslinked polymer networks include an inclusion complex functionalized with one or more reactive groups, and a polymer functionalized with one or more complimentary reactive groups. The reactive groups on the inclusion complex are capable of covalently bonding with the complimentary reactive groups on the polymer to form the present crosslinked polymer networks.

In embodiments, the inclusion complex is functionalized with one or more electrophilic groups, and the polymer is functionalized with one or more nucleophilic groups.

In other embodiments, the inclusion complex is functionalized with one or more nucleophilic groups, and the polymer is functionalized with one or more electrophilic groups.

Still in other embodiments, the polymer is a second inclusion complex functionalized with one or more complimentary reactive groups which are capable of covalently bonding to the reactive groups on the first functionalized inclusion complex.

In particularly useful embodiments, a cyclic oligosaccharide, e.g., cyclodextrin, is combined with a linear polymer, e.g., polyethylene glycol, to form the inclusion complex which is then functionalized to include electrophilic groups extending from the primary or secondary hydroxyl groups of the cyclic oligosaccharide. The functionalized inclusion complex is then combined with a functionalized polymer containing nucleophilic groups, such as albumin, collagen, polylysine or PEG synthesized to include primary amino groups. The two components react to form a matrix.

In general, methods of using the crosslinked compositions are also described herein. Such methods of use include, but are not meant to be limited to, as a bioadhesive, as a surgical sealant, as a hemostatic agent, for tissue augmentation, in the prevention of surgical adhesions, and for coating surfaces of synthetic implants, as drug delivery matrices and for ophthalmic applications.

BRIEF DESCRIPTION OF THE DRAWINGS

FIGS. 5A and 5B are diagrammatic representations of supramolecular compounds described herein.

DETAILED DESCRIPTION

Figure 1:
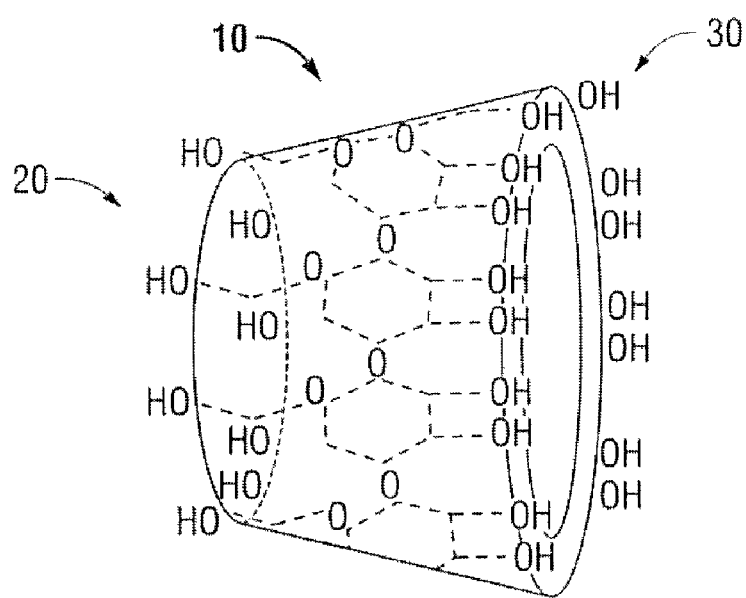
FIG. 1 is a diagrammatic representation of a cyclodextrin molecule.

In accordance with the present disclosure, crosslinked polymer networks are prepared by reacting two components. The first component is an inclusion complex functionalized with two or more reactive groups. The second component is a polymer functionalized with two or more groups capable of covalently binding with the reactive groups present on the functionalized inclusion complex.

In embodiments, an inclusion complex is functionalized with two or more electrophilic groups that react with nucleophilic groups present on the functionalized polymer.

In other embodiments, an inclusion complex functionalized with two or more nucleophilic groups is combined with a polymer functionalized with two or more electrophilic groups.

Suitable nucleophilic groups which may be present on either the inclusion complex or the polymer include, but not limited to, $-NH_2$, $-SH$, $-OH$, $-PH_2$, and $-CO-NH-NH_2$.

Illustrative examples of electrophilic groups include, but are not limited to, $-CO_2N(COCH_2)_2$, $-CO_2H$, $-CHO$, $-CHOCH_2$, $-N=C=O$, $-SO_2CH=CH_2$, $-N(COCH)_2$, $-ON(COCH)_2$, $-S-S-(C_5H_4N)$, benztriazole, p-nitrophenyl, carbonylimidazole, vinylsulfones, and maleimides.

It is contemplated by the present invention that the functional groups may be the same or different at each occurrence. Thus, the inclusion complex may have two different electrophilic groups, or two different nucleophilic groups, or the functional groups on the polymer or inclusion complex may be the same. Likewise, the functionalized polymer may include different types of functional groups or the groups may be the same on a given polymer.

The reactive groups may be coupled to the inclusion complex or polymer backbone by a linking group. Suitable linking groups include, but are not limited to, $-O-(CH_2)_n-$, $-S-(CH_2)_n-$, $-NH-(CH_2)_n-$, $O_2C-NH-(CH_2)_n-$, $-O_2C-(CH_2)_n-$, $O_2C-CR^1H-$, and $-O-R^2-CO-NH-$.

In addition, biodegradable groups may be inserted between any of the inclusion complex, the polymer, the reactive groups or linking groups, to increase degradation of the crosslinked polymer networks in vivo, for example, for use in drug delivery applications. Some useful biodegradable groups include, but are not limited to, lactide, glycolide, ε-caprolactone, poly(α-hydroxy acid), poly(amino acids), poly(anhydride), and various di- or tri-peptides.

Functionalized Inclusion Complexes

In order to prepare the compositions described in the present disclosure, it is first necessary to provide an inclusion complex functionalized with two or more reactive groups and a polymer functionalized with two or more complimentary reactive groups capable of covalently binding with the reactive group on the functionalized inclusion complex.

As used herein, the term "inclusion complex" refers to polymers formed using host-guest chemistry wherein one chemical compound, the host, forms a cavity within which at least a portion of the molecules of a second compound, the guest, either passes through or is located. In other words, the host compound surrounds at least a portion of the guest compound via the cavity in the host compound. In embodiments, at least a portion of the guest compound is stabilized within a cavity of the host compound by Van der Waals forces and to a lesser extent dipole-dipole interactions. In embodiments, at least a portion of the guest and host compounds are covalently bonded to one another.

In embodiments, a single host compound may be combined with a single guest compound to form an inclusion complex. In embodiments, a plurality of host compounds may share a common guest compound to form a series of inclusion complexes. In other embodiments, a single host compound may share a plurality of guest compounds to form an inclusion complex. In still other embodiments, a plurality of host compounds may be combined with a plurality of guest compounds to form a plurality of inclusion complexes.

Although any molecule or polymer capable of forming an inclusion complex as described herein may be used to form the present compositions, a particularly useful inclusion complex may be formed by using cyclic oligosaccharides, such as for example cyclodextrins, as the host compound.

As shown in FIG. 1, cyclodextrin 10 is a cyclic oligosaccharides with primary hydroxyl groups 20 and secondary hydroxyl groups 30 on the outer surface and a void cavity in the center. Cyclodextrins are often constituted by 6-8 glucopyranoside units, and can be topologically represented as toroids with larger and smaller openings that expose secondary 30 and primary 20 hydroxyl groups, respectively. Because of this arrangement, the exterior is sufficiently hydrophilic to render cyclodextrins (or their complexes) water soluble and the interior of the toroid is considerably less hydrophilic than the exterior and thus able to host other hydrophobic molecules. Suitable cyclodextrins include, but are not limited to, α-cyclodextrin, β-cyclodextrin and γ-cyclodextrin, consisting of 6, 7 and 8 α-1,4-linked glucose units, respectively. The number of these units determines the size of the cavity. The inclusion properties of cyclodextrins, namely, complex-formation between a guest compound and a cyclodextrin molecule, in aqueous solutions are thought to be stabilized by hydrophobic interactions, such as by the tendency of solvent water to push hydrophobic solutes of suitable size and shape into the essentially hydrophobic cavity, in order to attain the "most probable structure" of the solvent and obtain minimal energy in the overall system.

Figure 2:
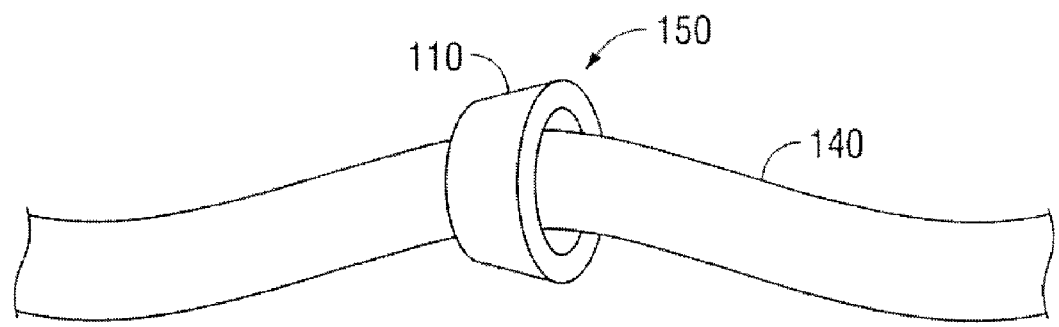
FIG. 2 is diagrammatic representation of the formation of an inclusion complex.

Turning to FIG. 2, host compound 110 is combined with guest compound 140 to form inclusion complex 150. In this illustrative embodiment, a cyclodextrin host compound is shown being combined with a polyethylene glycol guest compound to form an inclusion complex. As shown, portions of the polyethylene glycol guest compound pass through the cavity of the cyclodextrin host compound. It is envisioned that the guest compound may be selected from a variety of compounds including hydrophobic, hydrophilic and amphiphilic polymers. The guest compound may be natural or synthetic materials. The guest compound may be linear, branched, or dendrimetic.

Hydrophobic polymers which are useful for the present compositions include polyesters, such as poly(caprolactone), poly(glycolic acid), poly(lactic acid), poly(hydroxybutyrate); copolymers of caprolactone, glycolic acid, lactic acid, and hydroxybutryate; polyanhydrides, such as poly(adipic anhydride); poly(para-dioxanone); poly(malic acid); polyamines; polyurethanes; polyesteramides; polyorthoesters; polyacetals; polyketals; polycarbonates; polyorthocarbonates; polyphosphazenes; poly(amino acids); chitin; chitosan; poly(propylene oxide), poly(butylene oxide), polyolefins, polystyrene, poly(dimethyl siloxane), polyimides and copolymers and mixtures thereof.

Amphiphilic copolymers are polymers containing at least one segment of a hydrophobic polymer connected to at least one segment of a hydrophilic polymer. The copolymers may be block copolymers, di-block copolymers, tri-block copolymers, or multi-block copolymers, and the copolymers may be configured as linear chains or as grafted chains, including comb copolymers and star copolymers. Preferably, each segment is made of polymer which is non-toxic when present in an organism apart from any other polymer segment(s).

Examples of hydrophilic polymers, segments of which may be included in an amphiphilic block copolymer, include poly(ethylene glycol), poly(acrylamide), poly(vinyl alcohol), poly(vinylpyrrolidone), hydroxylated cellulose, carboxylated polymers such as carboxycellulose, and sulfonated polymers such as sulfonated polystyrene. General classes of polymers such as polyesters, polycarbonates, polyurethanes, and polyphosphazenes can be either hydrophilic or hydrophobic, depending on the composition of pendant groups and segments in the backbone.

Figure 3:
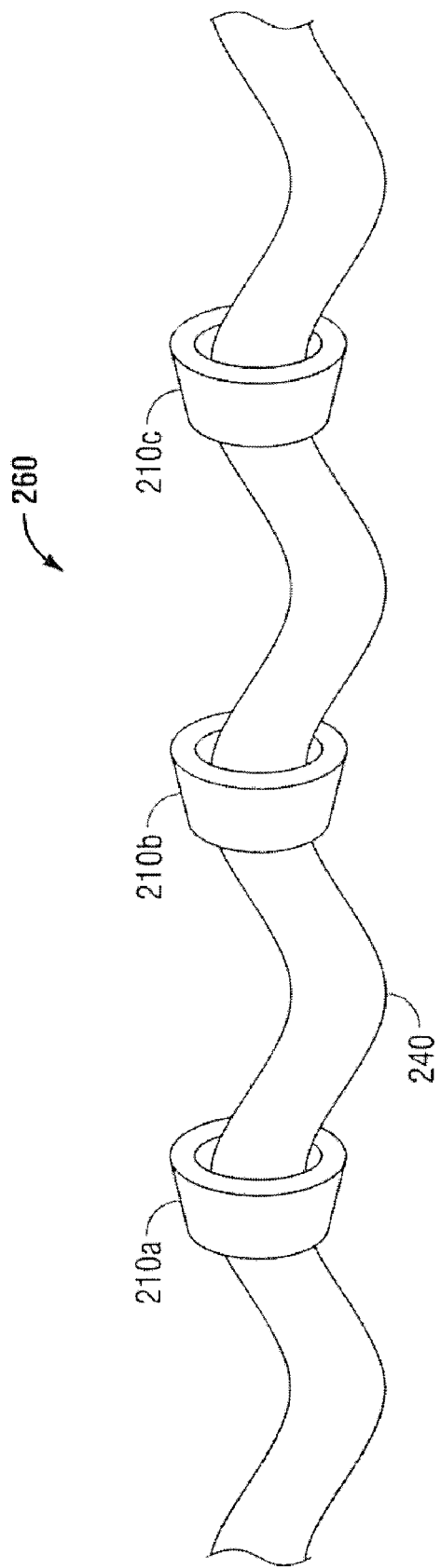
FIG. 3 is a diagrammatic representations of supramolecular compounds described herein.

In particularly useful embodiments, cyclodextrins possess an inclusion affinity for linear polymer chains. Some examples of linear polymer chains include polyethylene glycols, polyesters, and polyester-urethanes. As shown in FIG. 3, linear polymer chain 240 is capable of associating with a plurality of cyclodextrin host molecules 210a-c thereby forming supramolecular compound 260. In forming the supramolecular compounds, at least a portion the polymer chain passes through the cavity of more than one cyclic oligasaccharide. The plurality of inclusion complexes may be linked to one another via the polymer chain, using guest/host chemistry or any other type of chemical attraction, such as Van der Waals forces, covalent bonding, crosslinking, hydrogen bonding and the like.

Figure 4:
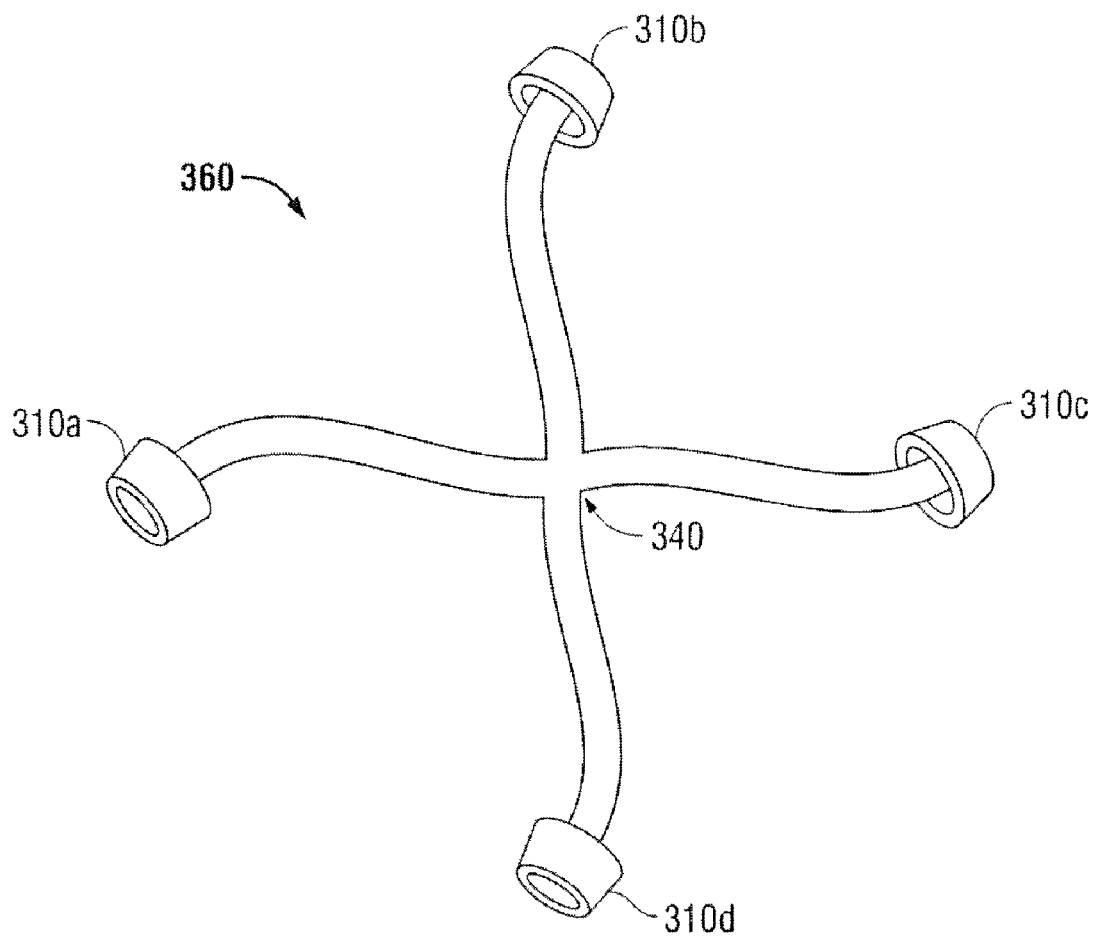
FIG. 4 is diagrammatic representation of supramolecular compounds described herein.

In embodiments, the supramolecular compounds include a plurality of inclusion complexes linked to each other via a guest polymer chain in a host-guest-host-guest or guest-hostguest-host manner. In the illustrative embodiment shown in FIG. 4, a branched or dendrimetic polymer 340, such as a multi-arm polyethylene glycol, is connected to a plurality of cyclodextrins 310a-d to form the supramolecular compound 360. It is envisioned that any number of cyclodextrins may be positioned along any portion of the branched polymer. In other embodiments, more than one cyclodextrin molecule may share or be connected to more than one polymer chain, to form different types of supramolecular compounds. Of course, the supramolecular compounds may be formed using any of the host/guest molecules described herein and is not meant to be limited to cyclodextrins and linear or branched polymers.

After the formation of the inclusion complexes, the primary hydroxyl groups 520a-e or secondary hydroxyl groups 530a-e on the cyclodextrin molecules 510a-c may be functionalized. As shown in FIGS. 5A and 5B, at least one of the primary hydroxyl groups 520a-e or secondary hydroxyl groups 530a-e may be modified to include nucleophilic groups (represented by the letter "X" in the figures) or electrophilic groups (represented by the letter "Y" in the figures). Some examples of nucleophilic groups include, but are not limited to, amino groups and thiol groups. Some examples of electrophilic groups include, but are not limited to, succinimidyl groups, N-hydroxysuccinimidyls, benzotriazoles, carbonylimidazoles, isocyanates, vinylsulfones, maleimides and p-nitrophenyls.

Figure 6B:
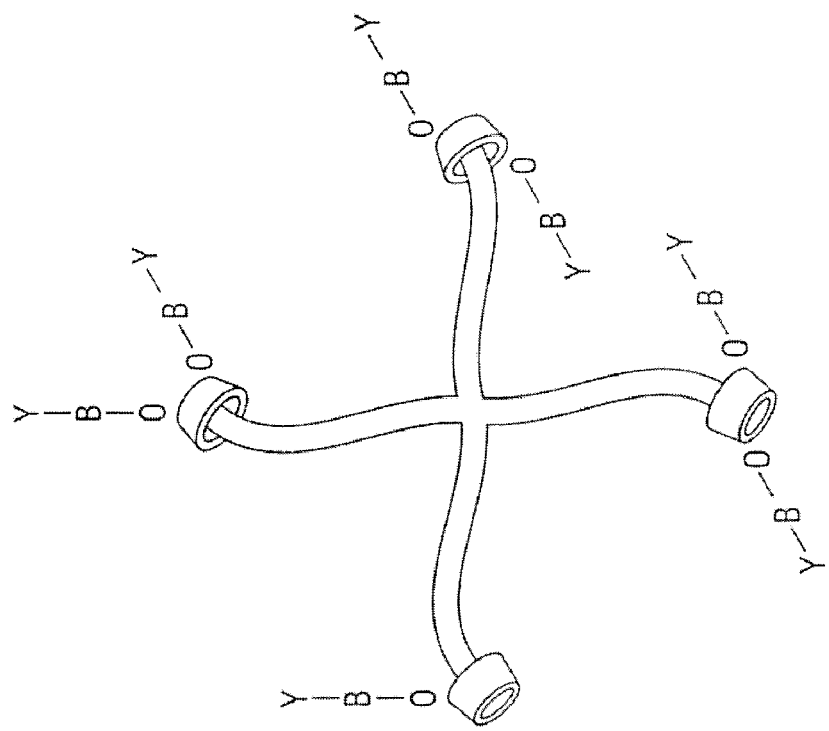
FIGS. 6A and 6B are diagrammatic representations of supramolecular compounds described herein.
Figure 6A:
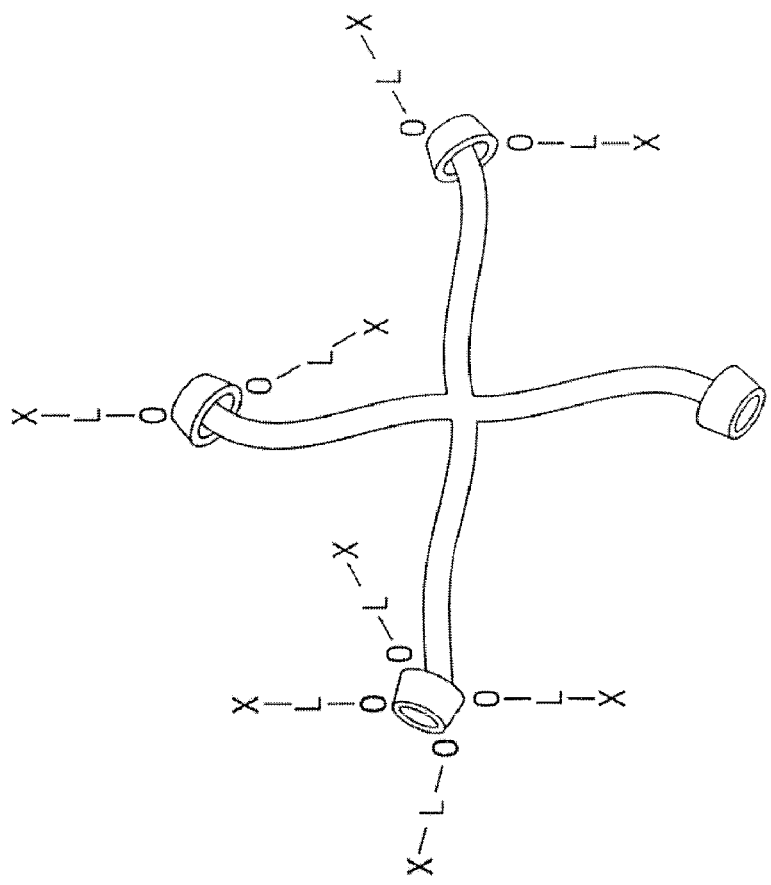

In addition, the use of linking groups and biodegradable groups as previously described herein may further be included in the formation of the functionalized inclusion complexes. More particularly, the primary or secondary hydroxyl groups on the cyclic oligasaccharides may be combined with a linking group (represented by the letter "L" in the figures) and/or a biodegradable group (represented by the letter "B" in the figures) or both before adding the nucleophilic or electrophilic group to the complex, as shown in FIGS. 6A and 6B.

The architecture of the functionalized inclusion complexes is such that at least a portion of the polymer guest compound is located in the cavity of the cyclodextrin host compound while the nucleophilic or electrophilic groups extend from the primary or secondary hydroxyl groups positioned outside the cavity. As the concentration of nucleophilic or electrophilic groups which extend from the primary or secondary hydroxyl groups increases positioned outside of the cavity, the faster the reaction will proceed with the complimentary reactive groups of the functionalized polymer.

Functionalized Polymers

As used herein, the term "polymer" refers to any biocompatible polymer. A variety of biocompatible polymers, both bioabsorbable and nonbioabsorbable, can be used in forming the compositions described herein. The biocompatible polymers can be synthetic polymers, natural polymers or combinations thereof.

The term "natural polymer" refers to polymers that are naturally occurring. Suitable examples of natural polymers include, but are not limited to, fibrin-based materials, elastin-based materials, thrombin-based materials, collagen-based materials, hyaluronic acid-based materials, glycoprotein-based materials, cellulose-based materials, silks, starches, chitins, chitosans, amino acids, gelatin, alginate, pectin, tropoelastin, ribonucleic acids, deoxyribonucleic acids, polypeptides, proteins, polysaccharides, polynucleotides and combinations thereof.

As used herein the term "synthetic polymer" refers to polymers that are not naturally occurring and that are produced via chemical synthesis, even if the polymers are made from naturally occurring biomaterials. Suitable biocompatible synthetic polymers include, but are not limited to, polymers selected from the group consisting of aliphatic polyesters, poly(amino acids), copoly(ether-esters), polyalkylenes oxalates, polyamides, tyrosine derived polycarbonates, poly (iminocarbonates), polyorthoesters, polyoxaesters, polyamidoesters, polyoxaesters containing amine groups, poly(anhydrides), polyphosphazenes, poly(propylene fumarate), polyurethane, poly(ester urethane), poly(ether urethane), polyacrylates, ethylene-vinyl acetates (and other acyl-substituted cellulose acetates), polyester (Dacron®), poly(ethylene terephthalate), polypropylene, polyethylene, polyurethanes, polystyrenes, polyvinyl oxides, polyvinyl fluorides, poly(vinyl imidazoles), chlorosulphonated polyolefins, polyethylene oxides, polyvinyl alcohols (PVA), polytetrafluoroethylenes, nylons, and blends and copolymers thereof.

Suitable synthetic polymers can also include biosynthetic polymers based on sequences found in collagen, laminin, glycosaminoglycans, elastin, thrombin, fibronectin, starches, poly(amino acid), gelatin, alginate, pectin, fibrin, oxidized cellulose, chitin, chitosan, tropoelastin, hyaluronic acid, silk, ribonucleic acids, deoxyribonucleic acids, polypeptides, proteins, polysaccharides, polynucleotides and combinations thereof.

In order to prepare the compositions described herein, it is first necessary to provide an inclusion complex functionalized with two or more reactive groups with a polymer functionalized with two or more complimentary reactive groups. The functionalized polymer refers to any of the biocompatible polymers as previously described herein which further includes, or has been modified to further include, one or more nucleophlic or electrophilic groups. A functionalized polymer is capable of reacting with the nucleophilic or electrophilic groups positioned on the functionalized inclusion complex to form a network or matrix. Both the inclusion complex and the polymers may be multifunctional which includes being difunctionally activated, trifunctionally activated, tetrafunctionally activated, etc.

In some embodiments, the multifunctionally activated polymers may contain at least two, more particularly, at least three, nucleophilic groups (i.e., "multi-nucleophilic polymers") in order to form a three-dimensional crosslinked network with the inclusion complexes functionalized with multiple electrophilic groups (i.e., "multi-electrophilic polymers"). In other words, they may be at least difunctionally activated, and are more preferably trifunctionally or tetrafunctionally activated.

In some embodiments, the inclusion complex is difunctionally activated and the polymer is functionalized with three or more functional groups in order to obtain a three-dimensional crosslinked network. In still other embodiments, both the inclusion complex and the polymer are multifunctional and contain at least three reactive groups.

Polymers Functionalized with Multiple Nucleophilic Groups

Polymers functionalized with multiple nucleophilic groups are also referred to generically herein as "multi-nucleophilic polymers". As described herein, multi-nucleophilic polymers contain at least two, more particularly, at least three, nucleophilic groups. If a polymer functionalized with only two nucleophilic groups is used, an inclusion complex functionalized with three or more electrophilic groups may be used in order to obtain a three-dimensional crosslinked network.

Multi-nucleophilic polymers for use in the compositions and methods of the present invention include polymers that contain, or have been modified to contain, multiple nucleophilic groups such as primary amino groups and thiol groups.

Particularly useful multi-nucleophilic polymers include: (i) synthetic polypeptides that have been synthesized to contain two or more primary amino groups or thiol groups; (ii) naturally occurring polymers that contain two or more primary amino or thiol groups; (iii) polyethylene glycols that have been modified to contain two or more primary amino groups or thiol groups; and (iv) inclusion complexes functionalized with two or more primary amino or thiol groups. In general, reaction of a thiol group with an electrophilic group tends to proceed more slowly than reaction of a primary amino group with an electrophilic group.

Synthetic multi-nucleophilic polypeptides are polypeptides that have been synthesized to incorporate amino acids containing primary amino groups (such as lysine) and/or amino acids containing thiol groups (such as cysteine). Poly(lysine), a synthetically produced polymer of the amino acid lysine (145 MW), is particularly useful. Poly(lysine)s have been prepared having anywhere from 6 to about 4,000 primary amino groups, corresponding to molecular weights of about 870 to about 580,000.

Useful poly(lysine)s generally have a molecular weight within the range of about 1,000 to about 300,000; more particularly, within the range of about 5,000 to about 100,000; and most particularly, within the range of about 8,000 to about 15,000. Poly(lysine)s of varying molecular weights are commercially available from Peninsula Laboratories, Inc. (Belmont, Calif.).

Polyethylene glycol can be chemically modified to contain multiple primary amino or thiol groups according to methods set forth, for example, in Chapter 22 of Poly(ethylene Glycol) Chemistry: Biotechnical and Biomedical Applications, J. Milton Harris, ed., Plenum Press, NY (1992). Polyethylene glycols which have been modified to contain two or more primary amino groups are referred to herein as "multi-amino PEGs". Polyethylene glycols which have been modified to contain two or more thiol groups are referred to herein as "multi-thiol PEGs". As used herein, the term "polyethylene glycol(s)" includes modified and or derivatized polyethylene glycol(s).

Various forms of multi-amino PEG are commercially available from Shearwater Polymers (Huntsville, Ala.) and from Texaco Chemical Company (Houston, Tex.) under the name "Jeffamine". Multi-amino PEGs useful in the present invention include Texaco's Jeffamine diamines ("D" series) and triamines ("T" series), which contain two and three primary amino groups per molecule, respectively. General structures for the Jeffamine diamines and triamines are shown in FIG. 3.

Polyamines such as ethylenediamine ($H_2N—CH_2CH_2—NH_2$), tetramethylenediamine ($H_2N—(CH_2)_4—NH_2$), pentamethylenediamine (cadaverine) ($H_2N—(CH_2)_5—NH_2$), hexamethylenediamine ($H_2N—(CH_2)_6—NH_2$), bis(2-hydroxyethyl)amine ($HN—(CH_2CH_2OH)_2$), bis(2-aminoethyl)amine ($HN—(CH_2CH_2NH)_2$), and tris(2-aminoethyl)amine ($N—(CH_2CH_2NH)_3$) may also be used as the polymer functionalized with multiple nucleophilic groups.

Polymers Functionalized with Multiple Electrophilic Groups

Polymers functionalized with multiple electrophilic groups are also referred to herein as "multi-electrophilic polymers." For use in the present invention, the multifunctionally activated polymers may contain at least two, more preferably, at least three, electrophilic groups in order to form a three-dimensional crosslinked network with inclusion complexes functionalized with multi-nucleophilic groups.

In embodiments, multi-electrophilic polymers for use in the compositions of the invention are polymers which contain two or more succinimidyl groups capable of forming covalent bonds with nucleophilic groups on the inclusion complexes. Succinimidyl groups are highly reactive with materials containing primary amino (—$NH_2$) groups, such as multi-amino PEG, poly(lysine), albumin or collagen. Succinimidyl groups are slightly less reactive with materials containing thiol (—SH) groups, such as multi-thiol PEG or synthetic polypeptides containing multiple cysteine residues.

As used herein, the term "containing two or more succinimidyl groups" is meant to encompass polymers which are commercially available containing two or more succinimidyl groups, as well as those that may be chemically derivatized to contain two or more succinimidyl groups. As used herein, the term "succinimidyl group" is intended to encompass sulfosuccinimidyl groups, hydroxysuccinimidyl groups and other such variations of the "generic" succinimidyl group. The presence of the sodium sulfite moiety on the sulfosuccinimidyl group serves to increase the solubility of the polymer.

Preparation of Crosslinked Compositions

In some embodiments, the crosslinked polymer compositions described herein are prepared by mixing an inclusion complex functionalized with multiple nucleophilic groups with a polymer functionalized with multiple electrophilic groups. Formation of a three-dimensional crosslinked network occurs as a result of the reaction between the nucleophilic group, on the inclusion complex and the electrophilic groups on the polymer.

In some embodiments, the crosslinked polymer compositions described herein are prepared by mixing an inclusion complex functionalized with multiple electrophilic groups with a polymer functionalized with multiple nucleophilic groups. Formation of a three-dimensional crosslinked network occurs as a result of the reaction between the electrophilic group, on the inclusion complex and the nucleophilic groups on the polymer.

The concentrations of the functionalized inclusion complex and the functionalized polymer used to prepare the present compositions will vary depending upon a number of factors, including the types and molecular weights of the particular molecules used and the desired end use application.

The crosslinked polymer compositions can also be prepared to contain various imaging agents such as iodine or barium sulfate, or fluorine, in order to aid visualization of the compositions after administration via X-ray, or $^{19}F$-MRI, respectively.

Administration of the Crosslinked Synthetic Polymer Compositions

The compositions of the present invention may be administered before, during or after crosslinking of the functionalized inclusion complex and the functionalized polymer. Certain uses, which are discussed in greater detail below, such as tissue augmentation, may require the compositions to be crosslinked before administration, whereas other applications, such as tissue adhesion, require the compositions to be administered before crosslinking has reached "equilibrium." The point at which crosslinking has reached equilibrium is defined herein as the point at which the composition no longer feels tacky or sticky to the touch.

In order to administer the composition prior to crosslinking, the functionalized inclusion complex and the functionalized polymer may be contained within separate barrels of a dual-compartment syringe. In this case, the two components do not actually mix until the point at which the two components are extruded from the tip of the syringe needle into the patient's tissue. This allows the vast majority of the crosslinking reaction to occur in situ, avoiding the problem of needle blockage which commonly occurs if the two components are mixed too early and crosslinking between the two components is already too advanced prior to delivery from the syringe needle. The use of a dual-compartment syringe, as described above, allows for the use of smaller diameter needles, which is advantageous when performing soft tissue augmentation in delicate facial tissue, such as that surrounding the eyes.

Alternatively, the functionalized inclusion complex and the functionalized polymer may be mixed according to the methods described above prior to delivery to the tissue site, then injected to the desired tissue site immediately following mixing.

In another embodiment, the functionalized inclusion complex and the functionalized polymer are mixed, then extruded and allowed to crosslink into a sheet or other solid form. The crosslinked solid may then be dehydrated to remove substantially all unbound water. The resulting dried solid may be ground or comminuted into particulates, then suspended in a nonaqueous fluid carrier, including, without limitation, hyaluronic acid, dextran sulfate, dextran, succinylated noncrosslinked collagen, methylated noncrosslinked collagen, glycogen, glycerol, dextrose, maltose, triglycerides of fatty acids (such as corn oil, soybean oil, and sesame oil), and egg yolk phospholipid. The suspension of particulates can be injected through a small-gauge needle to a tissue site. Once inside the tissue, the crosslinked polymer particulates will rehydrate and swell in size at least five-fold.

Use of Crosslinked Polymers to Deliver Charged Compounds

By varying the relative molar amounts of the functionalized inclusion complex and the functionalized polymer, it is possible to alter the net charge of the resulting crosslinked polymer composition, in order to prepare a matrix for the delivery of a charged compound (such as a protein or drug). As such, the delivery of charged proteins or drugs, which would normally diffuse rapidly out of a neutral carrier matrix, can be controlled.

For example, if a molar excess of an inclusion complex functionalized with multiple nucleophilic groups is used, the resulting matrix has a net positive charge and can be used to ionically bind and deliver negatively charged compounds. Examples of negatively charged compounds that can be delivered from these matrices include various drugs, cells, proteins, and polysaccharides. Negatively charged collagens, such as succinylated collagen, and glycosaminoglycan derivatives, such as sodium hyaluronate, keratan sulfate, keratosulfate, sodium chondroitin sulfate A, sodium dermatan sulfate B, sodium chondroitin sulfate C, heparin, esterified chondroitin sulfate C, and esterified heparin, can be effectively incorporated into the crosslinked polymer matrix as described above.

If a molar excess of a polymer functionalized with multiple electrophilic groups is used, the resulting matrix has a net negative charge and can be used to ionically bind and deliver positively charged compounds. Examples of positively charged compounds that can be delivered from these matrices include various drugs, cells, proteins, and polysaccharides. Positively charged collagens, such as methylated collagen, and glycosaminoglycan derivatives, such as esterified deacetylated hyaluronic acid, esterified deacetylated desulfated chondroitin sulfate A, esterified deacetylated desulfated chondroitin sulfate C, deacetylated desulfated keratan sulfate, deacetylated desulfated keratosulfate, esterified desulfated heparin, and chitosam, can be effectively incorporated into the crosslinked polymer matrix as described above.

Use of Crosslinked Polymers to Deliver Biologically Active Agents

The crosslinked polymer compositions of the present invention may also be used for localized delivery of various drugs and other biologically active agents. Biologically active agents such as growth factors may be delivered from the composition to a local tissue site in order to facilitate tissue healing and regeneration.

The term "biologically active agent" or "active agent" as used herein refers to organic molecules which exert biological effects in vivo. Examples of active agents include, without limitation, enzymes, receptor antagonists or agonists, hormones, growth factors, autogenous bone marrow, antibiotics, antimicrobial agents and antibodies. The term "active agent" is also intended to encompass various cell types and genes which can be incorporated into the compositions of the invention. The term "active agent" is also intended to encompass combinations or mixtures of two or more active agents, as defined above.

Preferred active agents for use in the compositions of the present invention include growth factors, such as transforming growth factors (TGFs), fibroblast growth factors (FGFs), platelet derived growth factors (PDGFs), epidermal growth factors (EGFs), connective tissue activated peptides (CTAPs), osteogenic factors, and biologically active analogs, fragments, and derivatives of such growth factors. Members of the transforming growth factor (TGF) supergene family, which are multifunctional regulatory proteins, are particularly preferred. Members of the TGF supergene family include the beta transforming growth factors (for example, TGF-.beta.1, TGF-.beta.2, TGF-.beta.3); bone morphogenetic proteins (for example, BMP-1, BMP-2, BMP-3MP-4, BMP-5, BMP-6, BMP-7, BMP-8, BMP-9); heparin-binding growth factors (for example, fibroblast growth factor (FGF), epidermal growth factor (EGF), platelet-derived growth factor (PDGF), insulin-like growth factor (IGF)); Inhibins (for example, Inhibin A, Inhibin B); growth differentiating factors (for example, GDF-1); and Activins (for example, Activin A, Activin B, Activin AB).

Growth factors can be isolated from native or natural sources, such as from mammalian cells, or can be prepared synthetically, such as by recombinant DNA techniques or by various chemical processes. In addition, analogs, fragments, or derivatives of these factors can be used, provided that they exhibit at least some of the biological activity of the native molecule. For example, analogs can be prepared by expression of genes altered by site-specific mutagenesis or other genetic engineering techniques.

Biologically active agents may be incorporated into the crosslinked polymer composition by admixture. Alternatively, the agents may be incorporated into the crosslinked polymer matrix, as described above, by binding these agents with the functional groups of the inclusion complex or polymers. Such compositions preferably include linkages that can be easily biodegraded, for example as a result of enzymatic degradation, resulting in the release of the active agent into the target tissue, where it will exert its desired therapeutic effect.

A simple method for incorporating biologically active agents containing nucleophilic groups into the crosslinked polymer composition involves mixing the active agent with the functionalized inclusion complex prior to adding the functionalized polymer. This procedure will result in covalent binding of the active agent to the crosslinked polymer composition, producing a highly effective sustained release composition.

The type and amount of active agent used will depend, among other factors, on the particular site and condition to be treated and the biological activity and pharmacokinetics of the active agent selected.

Use of Crosslinked Polymers to Deliver Cells or Genes

The crosslinked polymer compositions of the present invention can also be used to deliver various types of living cells or genes to a desired site of administration in order to form new tissue. The term "genes" as used herein is intended to encompass genetic material from natural sources, synthetic nucleic acids, DNA, antisense-DNA and RNA.

When used to deliver cells, for example, mesenchymal stem cells can be delivered to produce cells of the same type as the tissue into which they are delivered. Mesenchymal stem cells are not differentiated and therefore can differentiate to form various types of new cells due to the presence of an active agent or the effects (chemical, physical, etc.) of the local tissue environment. Examples of mesenchymal stem cells include osteoblasts, chondrocytes, and fibroblasts. Osteoblasts can be delivered to the site of a bone defect to produce new bone; chondrocytes can be delivered to the site of a cartilage defect to produce new cartilage; fibroblasts can be delivered to produce collagen wherever new connective tissue is needed; neurectodermal cells can be delivered to form new nerve tissue; epithelial cells can be delivered to form new epithelial tissues, such as liver, pancreas, etc.

The cells or genes may be either allogeneic or xenogeneic in origin. For example, the compositions can be used to deliver cells or genes from other species which have been genetically modified. Because the compositions of the invention are not easily degraded in vivo, cells and genes entrapped within the crosslinked polymer compositions will be isolated from the patient's own cells and, as such, will not provoke an immune response in the patient. In order to entrap the cells or genes within a crosslinked polymer matrix, the functionalized inclusion complex and the cells or genes may be pre-mixed, then the functionalized polymer is mixed into the functionalized inclusion complex/cell or gene mixture to form a crosslinked matrix, thereby entrapping the cells or genes within the matrix. Alternatively, the functionalized polymer and the cells or genes may be pre-mixed, then the functionalized inclusion complex is mixed into the functionalized polymer/cell or gene mixture to form a crosslinked matrix, thereby entrapping the cells or genes within the matrix.

As discussed above for biologically active agents, when used to deliver cells or genes, the polymers may also contain biodegradable groups to aid in controlled release of the cells or gene, at the intended site of delivery.

Use of the Crosslinked Polymers as Bioadhesives

In embodiments, the compositions of the present disclosure may have unusually high tackiness, making them particularly suitable for use as bioadhesives, for example, for use in surgery. As used herein, the terms "bioadhesive", "biological adhesive", and "surgical adhesive" are used interchangeably to refer to biocompatible compositions capable of effecting temporary or permanent attachment between the surfaces of two native tissues, or between a native tissue surface and a non-native tissue surface or a surface of a synthetic implant.

In a general method for effecting the attachment of a first surface to a second surface, the functionalized inclusion complex and the functionalized polymer are applied to a first surface, then the first surface is contacted with a second surface to affect adhesion between the first surface and the second surface. Preferably, the functionalized inclusion complex and functionalized polymer are first mixed to initiate crosslinking, then delivered to a first surface before substantial crosslinking has occurred between the nucleophilic groups on the functionalized inclusion complex and the electrophilic groups on the functionalized polymer. The first surface is then contacted with the second surface, preferably immediately, to effect adhesion between the two surfaces. At least one of the first and second surfaces is preferably a native tissue surface.

For example, the functionalized inclusion complex and functionalized polymer are generally provided in separate syringes, the contents of which are then mixed together using syringe-to-syringe mixing techniques just prior to delivery to a first surface. As crosslinking between the corresponding reactive groups on the two components is generally initiated during the mixing process, it is important to deliver the reaction mixture to the first surface as soon as possible after mixing.

The reaction mixture can be extruded onto the first surface from the opening of a syringe or other appropriate extrusion device. Following application, the extruded reaction mixture can be spread over the first surface using a spatula, if necessary. Alternatively, the functionalized inclusion complex and the functionalized polymer can be mixed together in an appropriate mixing dish or vessel, then applied to the first surface using a spatula.

In another method for preparing the reaction mixture, the functionalized inclusion complex and functionalized polymer are contained in separate chambers of a spray can or bottle with a nozzle, or other appropriate spraying device. In this scenario, the two components do not actually mix until they are expelled together from the nozzle of the spraying device. Following application of the reaction mixture to a surface containing collagen, the first surface is contacted with a second surface. If the two surfaces are contacted before substantial crosslinking has occurred between the two components, the reactive groups on the two components will also covalently bond with primary amino groups on lysine residues of collagen molecules present on either or both of the surfaces, providing improved adhesion.

The two surfaces may be held together manually, or using other appropriate means, while the crosslinking reaction is proceeding to completion. Crosslinking is typically complete within about 1 to 120 minutes after mixing of the first and second synthetic polymers. However, the time required for complete crosslinking to occur is dependent on a number of factors, including the types and molecular weights of the two components and, most particularly, the concentrations of the two components (i.e., higher concentrations result in faster crosslinking times).

At least one of the first and second surfaces is preferably a native tissue surface. As used herein, the term "native tissue" refers to biological tissues that are native to the body of the specific patient being treated and is intended to include biological tissues that have been elevated or removed from one part of the body of a patient for implantation to another part of the body of the same patient (such as bone autografts, skin flap autografts, etc.). For example, the compositions of the invention can be used to adhere a piece of skin from one part of a patient's body to another part of the body, as in the case of a burn victim.

The other surface may be a native tissue surface, a non-native tissue surface, or a surface of a synthetic implant. As used herein, the term "non-native tissue" refers to biological tissues that have been removed from the body of a donor patient (who may be of the same species or of a different species than the recipient patient) for implantation into the body of a recipient patient (e.g., tissue and organ transplants). For example, the crosslinked polymer compositions of the present invention can be used to adhere a donor cornea to the eye of a recipient patient.

As used herein, the term "synthetic implant" refers to any biocompatible material intended for implantation into the body of a patient not encompassed by the above definitions for native tissue and non-native tissue. Synthetic implants include, for example, artificial blood vessels, heart valves, artificial organs, bone prostheses, implantable lenticules, vascular grafts, stents, sutures, staples, clips, meshes, slings, screws, pins, cables, and combinations thereof.

Use of Crosslinked Polymer Compositions in Tissue Augmentation

The crosslinked polymer compositions of the invention can also be used for augmentation of soft or hard tissue within the body of a mammalian subject. Examples of soft tissue augmentation applications include sphincter (e.g., urinary, anal, esophageal) sphincter augmentation and the treatment of rhytids and scars. Examples of hard tissue augmentation applications include the repair and/or replacement of bone and/or cartilaginous tissue.

The compositions of the invention are particularly suited for use as a replacement material for synovial fluid in osteoarthric joints, where the crosslinked polymer compositions serve to reduce joint pain and improve joint function by restoring a soft hydrogel network in the joint. The crosslinked polymer compositions can also be used as a replacement material for the nucleus pulposus of a damaged intervertebral disk. As such, the nucleus pulposus of the damaged disk is first removed, then the crosslinked polymer composition is injected or otherwise introduced into the center of the disk. The composition may either be crosslinked prior to introduction into the disk, or allowed to crosslink in situ.

In a general method for effecting augmentation of tissue within the body of a mammalian subject, the functionalized inclusion complex and the functionalized polymer are injected simultaneously to a tissue site in need of augmentation through a small-gauge (e.g., 25-32 gauge) needle. Once inside the patient's body, the nucleophilic groups on the functionalized inclusion complex and the electrophilic groups on the functionalized polymer will react with each other to form a crosslinked polymer network in situ. Electrophilic groups on the functionalized polymer may also react with primary amino groups on lysine residues of collagen molecules within the patient's own tissue, providing for "biological anchoring" of the compositions with the host tissue.

Use of the Crosslinked Polymer Compositions to Prevent Adhesions

Another use of the crosslinked polymer compositions of the invention is to coat tissues in order to prevent the formation of adhesions following surgery or injury to internal tissues or organs. In a general method for coating tissues to prevent the formation of adhesions following surgery, the functionalized inclusion complex and functionalized polymers are mixed, then a thin layer of the reaction mixture is applied to the tissues comprising, surrounding, and/or adjacent to the surgical site before substantial crosslinking has occurred between the nucteophilic groups on the functionalized inclusion complex and the electrophilic groups on the functionalized polymer. Application of the reaction mixture to the tissue site may be by extrusion, brushing, spraying (as described above), or by any other convenient means.

Following application of the reaction mixture to the surgical site, crosslinking is allowed to continue in situ prior to closure of the surgical incision. Once crosslinking has reached equilibrium, tissues which are brought into contact with the coated tissues will not stick to the coated tissues. At this point in time, the surgical site can be closed using conventional means (sutures, etc.).

In general, compositions that achieve complete crosslinking within a relatively short period of time (i.e., 5-15 minutes following mixture of the first synthetic polymer and the second synthetic polymer) are particularly useful in the prevention of surgical adhesions, so that the surgical site may be closed relatively soon after completion of the surgical procedure.

Use of the Crosslinked Polymers to Coat Implants

Another use of the crosslinked polymer compositions of the invention is as a coating material for synthetic implants. In a general method for coating a surface of a synthetic implant, the two components are mixed, then a thin layer of the reaction mixture is applied to a surface of the implant before substantial crosslinking has occurred between the nucleophilic groups on the functionalized polymer and the electrophilic groups on the functionalized inclusion complex. In order to minimize cellular and fibrous reaction to the coated implant, the reaction mixture is preferably prepared to have a net neutral charge. Application of the reaction mixture to the implant surface may be by extrusion, brushing, spraying (as described above), or by any other convenient means. Following application of the reaction mixture to the implant surface, crosslinking is allowed to continue until complete crosslinking has been achieved.

Although this method can be used to coat the surface of any type of synthetic implant, it is particularly useful for implants where reduced thrombogenicity is an important consideration, such as artificial blood vessels and heart valves, vascular grafts, vascular stents, and stent/graft combinations. The method may also be used to coat implantable surgical membranes (e.g., monofilament polypropylene) or meshes (e.g., for use in hernia repair). Breast implants may also be coated using the above method in order to minimize capsular contracture.

The compositions of the present invention may also be used to coat lenticules, which are made from either naturally occurring or synthetic polymers.

Use of the Crosslinked Polymers to Treat Aneurism

The crosslinked polymer compositions of the invention can be extruded or molded in the shape of a string or coil, then dehydrated. The resulting dehydrated string or coil can be delivered via catheter to the site of a vascular malformation, such as an aneurysm, for the purpose of vascular occlusion and, ultimately, repair of the malformation. The dehydrated string or coil can be delivered in a compact size and will rehydrate inside the blood vessel, swelling several times in size compared to its dehydrated state, while maintaining its original shape.

Other Uses for the Crosslinked Polymers

The crosslinked polymer compositions of the invention can be used to block or fill various lumens and voids in the body of a mammalian subject. The compositions can also be used as biosealants to seal fissures or crevices within a tissue or structure (such as a vessel), or junctures between adjacent tissues or structures, to prevent leakage of blood or other biological fluids.

The crosslinked polymer compositions can also be used as a large space-filling device for organ displacement in a body cavity during surgical or radiation procedures, for example, to protect the intestines during a planned course of radiation to the pelvis.

The crosslinked polymer compositions of the invention can also be coated onto the interior surface of a physiological lumen, such as a blood vessel or Fallopian tube, thereby serving as a sealant to prevent restenosis of the lumen following medical treatment, such as, for example, balloon catheterization to remove arterial plaque deposits from the interior surface of a blood vessel, or removal of scar tissue or endometrial tissue from the interior of a Fallopian tube. A thin layer of the reaction mixture is preferably applied to the interior surface of the vessel (for example, via catheter) immediately following mixing of the two components. Because the compositions of the invention are not readily degradable in vivo, the potential for restenosis due to degradation of the coating is minimized. The use of crosslinked polymer compositions having a net neutral charge further minimizes the potential for restenosis.

What is claimed is:

1. A composition comprising:
   an inclusion complex functionalized with one or more reactive groups, and a polymer functionalized with one or more complimentary reactive groups capable of covalently bonding with the reactive groups present on the inclusion complex, wherein the inclusion complex comprises one or more cyclic oligosaccharides and multi-armed polymer chains.

2. The composition of claim 1 wherein the one or more cyclic oligosaccharides is a cyclodextrin.

3. The composition of claim 1 wherein the one or more multi-armed polymer chain is a multi-arm polyethylene glycol.

4. The composition of claim 1 wherein the functionalized inclusion complex comprises one or more reactive groups selected from the group consisting of electrophilic groups, nucleophilic groups and combinations thereof.

5. The composition of claim 1 wherein the functionalized polymer comprises one or more complimentary reactive groups selected from the group consisting of electrophilic groups, nucleophilic groups and combinations thereof.

6. The composition of claim 1 wherein the functionalized inclusion complex further comprises a chain extender selected from the group consisting of a linking group, a biodegradable group, and combinations thereof.

7. The composition of claim 1 wherein the functionalized polymer further comprises a chain extender selected from the group consisting of a linking group, a biodegradable group, and combinations thereof.

8. A composition comprising:
   an inclusion complex functionalized with one or more electrophilic groups, and a polymer functionalized with one or more nucleophilic groups, wherein the inclusion complex comprises one or more cyclic oligosaccharides and multi-armed polymer chains and wherein the one or more nucleophilic groups is capable of covalently bonding with the one or more electrophilic groups.

9. The composition of claim 8 wherein the one or more cyclic oligosaccharide is a cyclodextrin.

10. The composition of claim 8 wherein the one or more multi-armed polymer chain is a multi-arm polyethylene glycol.

11. The composition of claim 8 wherein the functionalized inclusion complex comprises electrophilic groups selected from the group consisting of $-CO_2N(COCH_2)_2$, $-CO_2H$, $-CHO$, $-CHOCH_2$, $-N=C=O$, $-SO_2CH=CH_2$, $-N(COCH)_2$, $-S-S-(C_5H_4N)$, and combinations thereof.

12. The composition of claim 8 wherein the functionalized polymer comprises one or more nucleophilic groups selected from the group consisting of $-NH_2$, $-SH$, $-OH$, $-PH_2$, $-CO-NH-NH_2$ and combinations thereof.

13. The composition of claim 8 wherein the functionalized inclusion complex further comprises a chain extender selected from the group consisting of a linking group, a biodegradable group, and combinations thereof.

14. The composition of claim 8 wherein the functionalized polymer further comprises a chain extender selected from the group consisting of a linking group, a biodegradable group, and combinations thereof.

15. A composition comprising:
   an inclusion complex functionalized with one or more nucleophilic groups, and a polymer functionalized with one or more electrophilic groups, wherein the inclusion complex comprises one or more cyclic oligosaccharides and multi-armed polymer chains and wherein the one or more nucleophilic groups is capable of covalently bonding with the one or more electrophilic groups.

16. The composition of claim 15 wherein the one or more cyclic oligosaccharide is a cyclodextrin.

17. The composition of claim 15 wherein the one or more multi-armed polymer chain is a multi-arm polyethylene glycol.

18. The composition of claim 15 wherein the functionalized inclusion complex comprises electrophilic groups selected from the group consisting of $-CO_2N(COCH_2)_2$, $-CO_2H$, $-CHO$, $-CHOCH_2$, $-N=C=O$, $-SO_2CH=CH_2$, $-N(COCH)_2$, $-S-S-(C_5H_4N)$, and combinations thereof.

19. The composition of claim 15 wherein the functionalized polymer comprises one or more nucleophilic groups selected from the group consisting of $-NH_2$, $-SH$, $-OH$, $-PH_2$, $-CO-NH-NH_2$ and combinations thereof.

20. A composition comprising:
   a first inclusion complex functionalized with one or more nucleophilic groups, and a second inclusion complex functionalized with one or more electrophilic groups, wherein at least one of the first inclusion complex and the second inclusion complex comprises one or more cyclic oligosaccharides and multi-armed polymer chains and wherein the one or more nucleophilic groups is capable of covalently bonding with the one or more electrophilic groups.

21. A method for preparing a composition comprising the steps of:
   providing an inclusion complex functionalized with one or more electrophilic groups and a polymer functionalized with one or more nucleophilic groups;
   forming a mixture by mixing the functionalized inclusion complex with the functionalized polymer to initiate crosslinking; and
   allowing the functionalized inclusion complex and the functionalized polymer to continue crosslinking to form a crosslinked polymer composition, wherein the inclusion complex comprises one or more cyclic oligosaccharides and multi-armed polymer chains.

22. A composition comprising:
   an inclusion complex functionalized with one or more reactive groups, and a polymer functionalized with one or more complimentary reactive groups capable of covalently bonding with the reactive groups present on the inclusion complex, wherein the functionalized inclusion complex further comprises a chain extender selected from the group consisting of a linking group, a biodegradable group, and combinations thereof, wherein the inclusion complex comprises one or more cyclic oligosaccharides and multi-armed polymer chains.

* * * * *